US012195888B2

(12) United States Patent
Byun

(10) Patent No.: US 12,195,888 B2
(45) Date of Patent: Jan. 14, 2025

(54) LIGHT-BLOCKING FABRIC AND MANUFACTURING METHOD THEREFOR

(71) Applicant: WINPLUS CO., LTD., Cheongju-si (KR)

(72) Inventor: Tae Woong Byun, Daejeon (KR)

(73) Assignee: WINPLUS CO., LTD., Cheongju-si (KR)

( * ) Notice: Subject to any disclaimer, the term of this patent is extended or adjusted under 35 U.S.C. 154(b) by 194 days.

(21) Appl. No.: 16/765,568

(22) PCT Filed: Nov. 12, 2018

(86) PCT No.: PCT/KR2018/013704

§ 371 (c)(1),
(2) Date: May 20, 2020

(87) PCT Pub. No.: WO2019/146887

PCT Pub. Date: Aug. 1, 2019

(65) Prior Publication Data

US 2020/0308733 A1 Oct. 1, 2020

(30) Foreign Application Priority Data

Jan. 26, 2018 (KR) ........................ 10-2018-0010179

(51) Int. Cl.
*A47H 23/08* (2006.01)
*D03D 1/06* (2006.01)
(Continued)

(52) U.S. Cl.
CPC ............... *D03D 1/06* (2013.01); *A47H 23/08* (2013.01); *E06B 9/36* (2013.01); *E06B 9/362* (2013.01); *E06B 9/42* (2013.01); *D10B 2503/03* (2013.01)

(58) Field of Classification Search
CPC ..... E06B 9/36; E06B 9/38; B32B 5/14; B32B 7/023; B65H 5/06; B65H 37/02; B65H 29/006; D03D 1/007; A47H 23/08
See application file for complete search history.

(56) References Cited

U.S. PATENT DOCUMENTS 2,110,145 A * 3/1938 Loehr ..................... E06B 9/264 160/178.3
2,267,869 A * 12/1941 Loehr ....................... E06B 9/34 160/133

(Continued)

FOREIGN PATENT DOCUMENTS

JP H06088469 A 3/1994
KR 200261897 Y1 1/2002

(Continued)

OTHER PUBLICATIONS

International Search Report PCT/ISA/210 for International Application PCT/KR2018/013704 Filed Nov. 12, 2018.

*Primary Examiner* — Abe Massad
(74) *Attorney, Agent, or Firm* — Dinsmore & Shohl LLP; Yongsok Choi, Esq.

(57) ABSTRACT

The present invention relates to: a light-blocking fabric usable in blinds for shading or wind protection; and a manufacturing method therefor. The light-blocking fabric including: two light-shielding parts which are made of a non-transparent fabric; and a light-transmitting part located between the two light-shielding parts, and attached to a position that is at least half of any one surface of the light-shielding parts so as to overlap therewith in the longitudinal direction, wherein the light-shielding parts and the light-transmitting part can be attached together by various methods such as hot melting, an adhesive, sewing, or ultrasonic welding.

6 Claims, 12 Drawing Sheets

(51) Int. Cl.
*E06B 9/36* (2006.01)
*E06B 9/42* (2006.01)

(56) References Cited

U.S. PATENT DOCUMENTS 3,844,330 A * 10/1974 Hyman .................. A47H 23/04 160/168.1 V
3,851,699 A * 12/1974 Shapiro ..................... E06B 9/36 160/168.1 V
3,946,789 A * 3/1976 Ronkholz-Tolle, nee Tolle .......... E06B 9/36 160/84.04
5,297,607 A * 3/1994 Beauchamp ............ E06B 9/367 160/84.04
5,339,883 A * 8/1994 Colson .................... E06B 9/262 160/84.05
5,392,832 A * 2/1995 Colson .................... E06B 9/262 160/176.1 V
5,419,385 A * 5/1995 Vogel ...................... E06B 9/262 160/84.05
5,490,553 A * 2/1996 Colson .................... E06B 9/386 160/84.06
5,638,880 A * 6/1997 Colson .................... E06B 9/262 156/308.2
5,638,881 A * 6/1997 Ruggles .................. E06B 9/386 160/168.1 V
5,749,404 A * 5/1998 Colson .................... E06B 9/262 160/84.04
D397,571 S * 9/1998 Anthony ........................ D6/575
5,937,927 A * 8/1999 Keith ........................ E06B 9/36 160/168.1 V
6,112,797 A * 9/2000 Colson ...................... E06B 9/24 160/DIG. 7
6,164,363 A * 12/2000 Colson .................... E06B 9/262 160/84.05
6,171,424 B1 * 1/2001 Barss .................. B29C 66/1122 156/193
6,186,213 B1 * 2/2001 Senesac .................... E06B 9/36 160/84.04
6,311,755 B1 * 11/2001 Ruggles .................. E06B 9/262 160/84.04
6,334,477 B1 * 1/2002 Moir ....................... E06B 9/264 160/168.1 V
6,510,885 B1 * 1/2003 Shih ........................ E06B 9/262 160/236
6,675,858 B2 * 1/2004 Marocco ................. E06B 9/262 160/168.1 V
6,688,373 B2 * 2/2004 Corey ....................... E06B 9/36 160/84.05
6,786,269 B2 * 9/2004 Senesac .................. E06B 9/262 160/168.1 V
6,789,596 B1 * 9/2004 Lin ......................... E06B 9/264 160/168.1 V
6,823,923 B2 * 11/2004 Palmer .................... E06B 9/266 160/84.05
7,163,043 B2 * 1/2007 Huang .................... E06B 9/264 160/84.04
7,165,594 B2 * 1/2007 Senesac .................. E06B 9/262 160/178.1 V
8,950,462 B2 * 2/2015 Cha ...................... D03D 15/587 160/84.05
11,187,031 B2 * 11/2021 Huang ...................... E06B 9/36
2006/0249261 A1 * 11/2006 Elembaby ................. E06B 9/36 160/89
2007/0006979 A1 * 1/2007 Hsu ......................... E06B 9/262 160/89
2007/0267153 A1 * 11/2007 Hardy ..................... E06B 9/367 160/168.1 V
2008/0236766 A1 * 10/2008 Vandervoort ..... B29C 66/73116 160/172 V
2017/0354285 A1 * 12/2017 Kim ....................... A47H 13/02
2018/0298684 A1 * 10/2018 Siebenaller ............. E06B 9/368

FOREIGN PATENT DOCUMENTS

KR 10-2010-0052196 A 5/2010
KR 10-2013-0086444 A 8/2013
KR 101506253 B1 3/2015
KR 101580632 B1 12/2015
KR 10-2017-0064766 A 6/2017
KR 101881501 B1 7/2018
WO WO-2011155675 A1 * 12/2011 ............... E06B 9/24

* cited by examiner

LIGHT-BLOCKING FABRIC AND MANUFACTURING METHOD THEREFOR

This application is a national phase under 35 U.S.C. § 371 of PCT International Application No. PCT/KR2018/013704 which has an International filing date of Nov. 12, 2018, which claims priority to Korean Patent Application 10-2018-0010179 filed Jan. 26, 2018, the entire contents of each of which are hereby incorporated by reference.

TECHNICAL FIELD

The present invention relates to a light-blocking fabric usable for blinds for shading or wind protection and a manufacturing method therefore.

BACKGROUND ART

In general, curtains or blinds are mainly used to be installed in a building and serve as shading or wind protection. Here, curtains are a generic term for curtains installed on windows or doorways of buildings or used as partitions, and blinds refer to objects that are hung on windows to block light.

Blinds can adjust the degree of shading in a variety of ways. Depending on the shading method and structure, the blinds may be classified into vertical blinds, Venetian blinds, Roman shades, roller blinds, and the like.

Among the above-mentioned types of blinds, vertical blinds are relatively inexpensive, easy to install and use, and can create a unique and elegant appearance, so the vertical blinds are installed and used on window frames of verandas or balconies of a multi-family house such as a tenement house and apartment, or on the inside of windows of an offices or officetel.

While the vertical blinds can control the amount of light entering the room, and can allow a person to see outside views even when the blinds are closed, a person in the room can be seen and observed from outside because the vertical blinds are composed of a plurality of vertical slats, which is disadvantageous in that the vertical blinds may not be suitable for privacy. To prevent this, a method of changing the angle of the blind slats is used, but in this case, the degree of light transmittance of the vertical blinds may be lowered.

Additionally, the vertical blinds are generally made of synthetic resin, wood, aluminum sheets, fiber, or the like, and perform only a shading function. Accordingly, this may be inadequate to provide a decorative effect to interior functions of rooms, thereby making it difficult to gentrify the appearance of products, and the productability may be reduced due to the uniformity of manufacturing costs.

Accordingly, in an effort to overcome the above technical problems, for curtain-type vertical blinds in which a light-transmitting part and a non-light-transmitting part are integrally woven, various attempts have been made to provide a shading function, a privacy protection function, a decorative effect, and an insulating effect.

In the case of Patent Document 1 invented by the present inventor, upon winding in a roll form, wrinkles may be generated on a light-transmitting part due to an inner space formed due to the difference in thickness between the light-transmitting part made of a mesh fabric and a light-shielding part made of a non-transparent fabric.

Additionally, upon winding in a roll form, wrinkles may be generated on the inside of the light-shielding part due to the difference in circumference between the inside and the outside of the light-shielding part, which may cause a reduction in productability.

Moreover, when a blind is folded as needed, the gaps in the blind may be eccentrically widened.

DISCLOSURE

Technical Problem

Accordingly, the present invention has been made keeping in mind the above problems occurring in the related art, and an objective of the present invention is to provide a light-blocking fabric by improving the conventional technology invented by the present inventor, wherein the light-blocking fabric is manufactured by attaching a light-transmitting part made of a mesh fabric between two light-shielding parts made of a non-transparent fabric, whereby when wound in a roll form, the light-blocking fabric is wound uniformly without wrinkles on the inside of the light-shielding parts, which may occur due to the difference in circumference between the inside and the outside of the light-shielding parts.

Another objective of the present invention is to provide a light-blocking fabric, wherein when wound in a roll form, the light-blocking fabric is wound uniformly without wrinkles on a light-transmitting part, which may occur due to an inner space formed due to the difference in thickness between the light-transmitting part made of a mesh fabric and a light-shielding part made of a non-transparent fabric.

Still another objective of the present invention is to provide a light-blocking fabric capable of preventing the problem that when a blind manufactured using the light-blocking fabric is folded as need, the gaps in the blind may be eccentrically widened.

Technical Solution

In order to accomplish the above objective, the present invention provides a light-blocking fabric usable for blinds for shading or wind protection, the light-blocking fabric including: two light-shielding parts made of a non-transparent fabric; and a light-transmitting part located between the two light-shielding parts, and attached to the light-shielding parts to a position that is at least half of any one surface of the light-shielding parts so as to overlap therewith along a longitudinal direction, wherein the light-spieling parts and the light transmitting part may be attached together by various methods such as hot melting, an adhesive, sewing, or ultrasonic welding.

Furthermore, the present invention provides a manufacturing method for a light-blocking fabric, the manufacturing method including: (a) a first injection step of unwinding two light-shielding part fabrics wound in a roll form, and injecting the same into a fabric processing apparatus; (b) a coating step of coating, with an adhesive, the position of at least half of any one surface of the two light-shielding part fabrics in the longitudinal direction while the two light-shielding part fabrics move along a guide part of the fabric processing apparatus; (c) a second injection step of unwinding a mesh fabric wound in a roll form, horizontally arranging and injecting the same into the fabric processing apparatus such that the same overlaps with the two light-shielding part fabrics on which the adhesive is coated in the coating step, at a position therebetween; (d) a manufacturing step of manufacturing a light-blocking fabric by attaching, to the mesh fabric injected in the second injection step, the two light-shielding part fabrics on which the adhesive is coated in the coating step along the guide part of the fabric processing apparatus; and (e) a winding step of winding, in a roll form, the light-blocking fabric manufactured in the manufacturing step.

Advantageous Effects

According to the present invention, the light-blocking fabric is manufactured by attaching the light-transmitting part along the longitudinal direction to the position of at least half of any one surface of the two light-shielding parts. Thus, when wound in a roll form, the light-blocking fabric can be wound uniformly without wrinkles on the light-shielding parts and the light-transmitting part by balancing the thickness of the light-shielding parts and the light-transmitting part, thereby making it possible to prevent the problem of degrading the aesthetic appearance due to wrinkles. It is also possible to prevent the problem that when a blind manufactured using the light-blocking fabric is folded as need, the gaps in the blind may be eccentrically widened.

DESCRIPTION OF THE REFERENCE NUMERALS IN THE DRAWINGS

Figure 1:
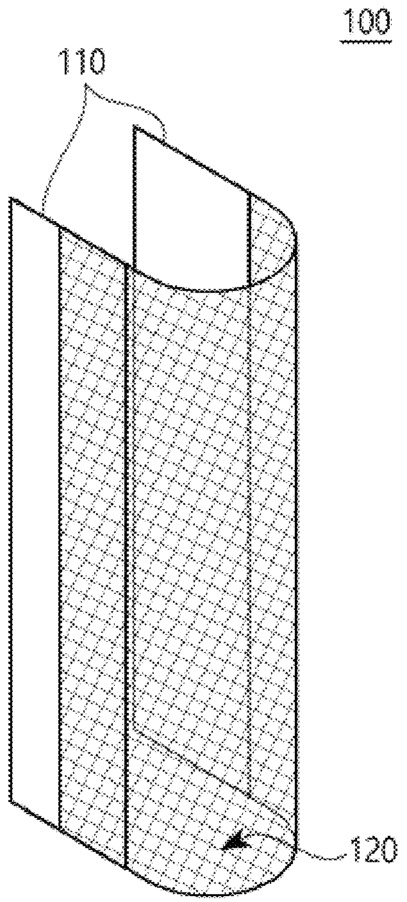
FIG. 1 is a view illustrating a configuration of a light-blocking fabric according to the present invention.

100: light-blocking fabric
110: light-shielding part
120: light-transmitting part
130: installation hole
140: fixing means
141: coupling hole
143: space
145: fixing pin
200: blind housing
210: guide rail
220: roller
230: adjustment cord

BEST MODE

Hereinbelow, exemplary embodiments of the present invention will be described in detail with reference to the accompanying drawings such that the invention can be easily embodied by one of ordinary skill in the art to which this invention belongs.

The present invention provides a light-blocking fabric which can be wound in a roll form uniformly without wrinkles on a light-shielding part and a light-transmitting part by balancing the thickness of the light-shielding part and the light-transmitting part, and can enable a blind to avoid the problem that the gaps in the blind may be eccentrically widened when the blind is folded as needed.

Referring to FIG. 1, the light-blocking fabric 100 according to the present invention is a light-blocking fabric which includes two light-shielding parts 110 made of a non-transparent fabric, and a light-transmitting part 120 made of a mesh fabric, located between the two light-shielding parts 110, and attached to a position that is at least half of any one surface of the light-shielding parts 110 so as to overlap therewith along the longitudinal direction. The light-blocking fabric can be used for blinds by continuously coupling adjacent light-blocking fabrics to each other.

In order to manufacture the above-described light-blocking fabric 100, the light-shielding parts 110 may use a fabric capable of blocking light into the room due to the low passage of light and wind, and a fabric such as non-transparent fabric.

The light-transmitting part 120 may use a fabric which is made of a mesh material capable of allowing the passage of air between the indoor and outdoor spaces while the light-shielding part 110 blocks light, and transmitting a certain amount of light. The material of the light-transmitting part 120 is not limited to a specific one. For example, a thin mesh cloth which is free to bend may be used, and various types of mesh fabrics may be selectively attached depending on the pattern or shape. Functionally, it is preferable to use a material having a transparency capable of appropriately reducing the shading and light level in the room.

Figure 2:
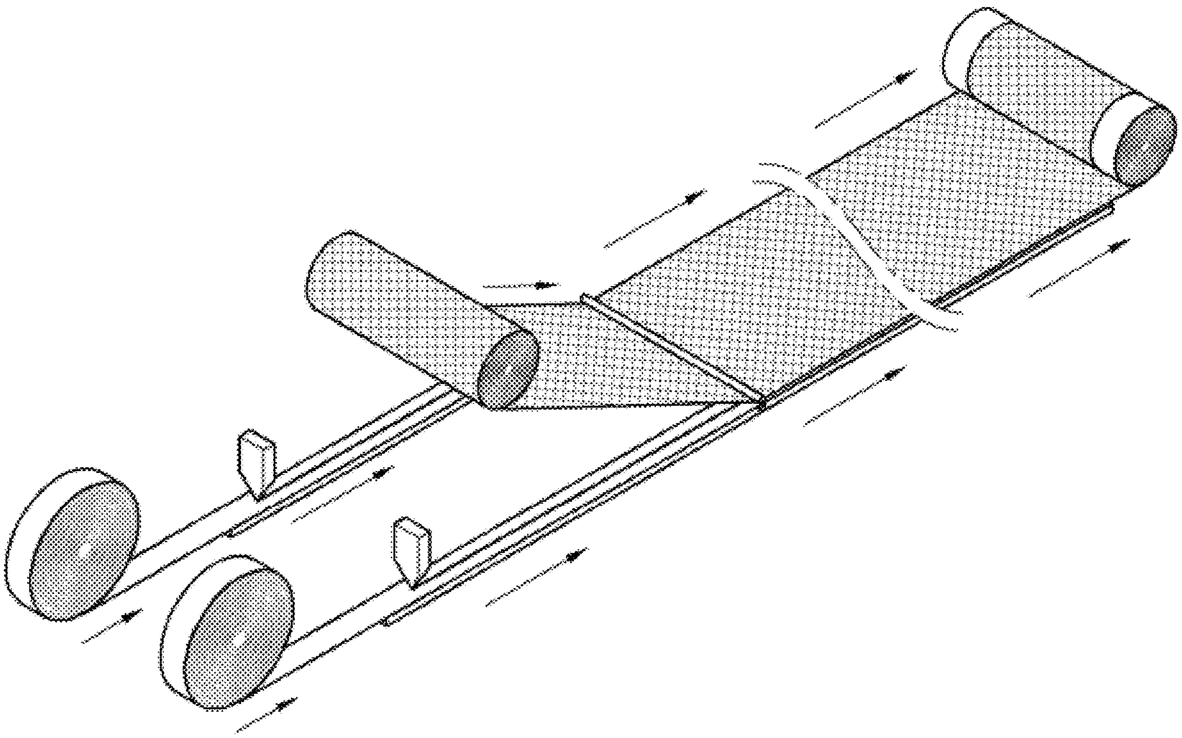
FIG. 2 is a conceptual view illustrating a manufacturing method for a light-blocking fabric according to the present invention.

Referring to FIG. 2, in order to manufacture the light-blocking fabric 100, the prevent invention provides a manufacturing method for a light-blocking fabric, the method including: (a) a first injection step of unwinding two light-shielding part fabrics wound in a roll form, and injecting the same into a fabric processing apparatus; (b) a coating step of coating, with an adhesive, the position of at least half of any one surface of the two light-shielding part fabrics in the longitudinal direction while the two light-shielding part fabrics move along a guide part of the fabric processing apparatus; (c) a second injection step of unwinding a mesh fabric wound in a roll form, horizontally arranging and injecting the same into the fabric processing apparatus such that the same overlaps with the two light-shielding part fabrics on which the adhesive is coated in the coating step, at a position therebetween; (d) a manufacturing step of manufacturing a light-blocking fabric by attaching, to the mesh fabric injected in the second injection step, the two light-shielding part fabrics on which the adhesive is coated in the coating step along the guide part of the fabric processing apparatus; and (e) a winding step of winding, in a roll form, the light-blocking fabric manufactured in the manufacturing step.

At this time, the mesh fabric may be transferred to be positioned parallel to the longitudinal direction at a position of at least half of any one surface of the two fabrics so that the two fabrics and the mesh fabric integrally overlap with each other to manufacture a light-blocking fabric 100.

In particular, the manufactured light-blocking fabric 100 may be configured to be able to be wound by the fabric processing apparatus in a roll form without being limited by length, and thus the light-blocking fabric 100 may also be manufactured in a roll form. However, the present invention is not limited to this.

In order to integrally attach the above fabrics and mesh fabric in an overlapping form, a hot melt subjected to thermal treatment may be applied to the position of at least half of any one surface of the fabrics, or a fabric adhesive may be applied to the position, and then the fabrics and mesh fabric may be compressed to be attached together. The fabrics and mesh fabric may also be coupled to each other by stitching, sewing, or ultrasonic welding, and thus the fabrics and mesh fabric may be bonded together by various methods without being limited by the attachment method, thereby forming the light-shielding parts 110 and the light-transmitting part 120 of the light-blocking fabric 100 according to the present invention.

After the light-blocking fabric 100 in which the fabrics and mesh fabric are coupled to each other is manufactured as described above, when used for a blind, the light-blocking fabric may be cut to a predetermined length suitable for a space where the blind is to be installed, and then cut pieces may be coupled to each other to form a blind. When using the above-described light-blocking fabric 100, there is an advantage in that blinds can be installed in a desired length without being constrained by space.

Figure 3:
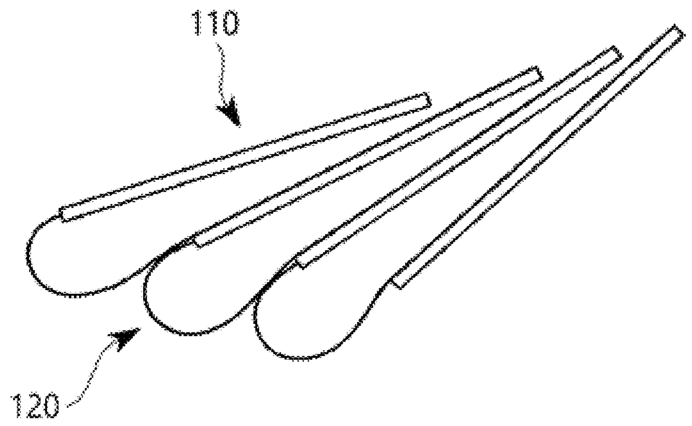
FIG. 3 is a sectional view illustrating a problem occurring in the Document 1 invented by the present inventor.

Referring to FIG. 3, the Document 1 is a light-blocking fabric comprised of a single light-shielding part 110 and a light-transmitting part 120 connected to the end thereof. When a blind is manufactured by fixedly coupling a plurality of pieces of the light-blocking fabric, when the blind is adjusted to be closed for shading or wind protection, the gaps in the blind may be eccentrically widened due to the property of the light-transmitting part 120 that tends to be unfolded.

Figure 4:
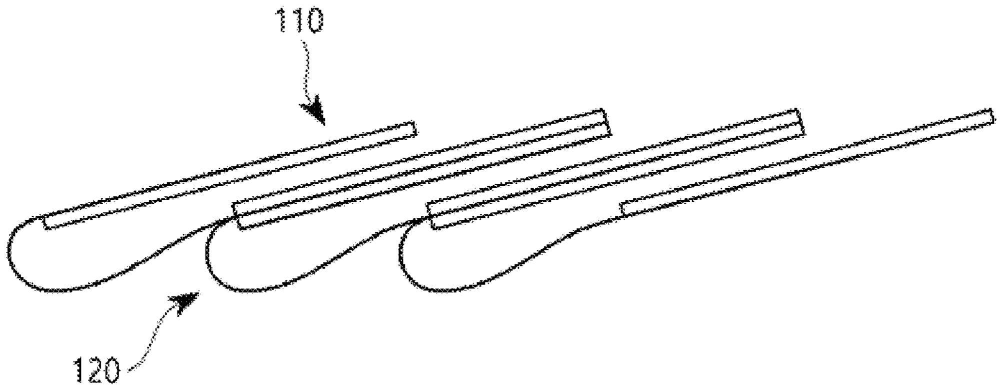
FIG. 4 is a sectional view illustrating an improved appearance due to the light-blocking fabric according to the present invention.

Accordingly, in the present invention, the two light-shielding parts 110 and the light-transmitting part 120 attached between the two light-shielding parts 110 are configured such that the light-transmitting part 120 is integrally attached to the position of at least half of any one surface of the two light-shielding parts 110 so as to overlap therewith along the longitudinal direction. Thus, as illustrated in FIG. 4, the present invention has an advantage in that the property of the light-transmitting part 120 that tends to be unfolded can be sufficiently suppressed when the blind is adjusted to be closed for shading or wind protection, whereby the the closed blind can avoid the problem that the gaps in the blind may be eccentrically widened, while maintaining shape.

Figure 5:
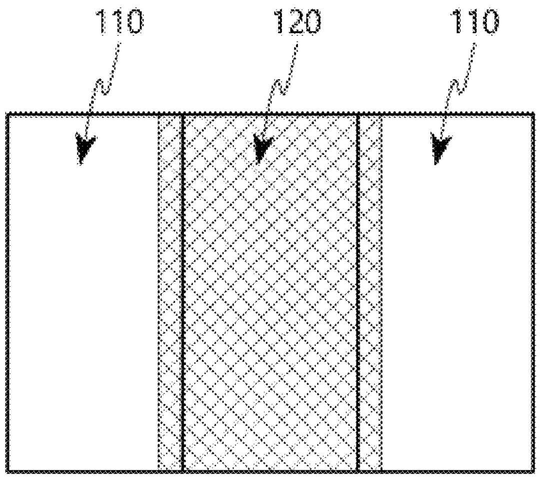
FIGS. 5 to 8 are plan views illustrating a method of improving the Document 1 invented by the present inventor.
Figure 6:
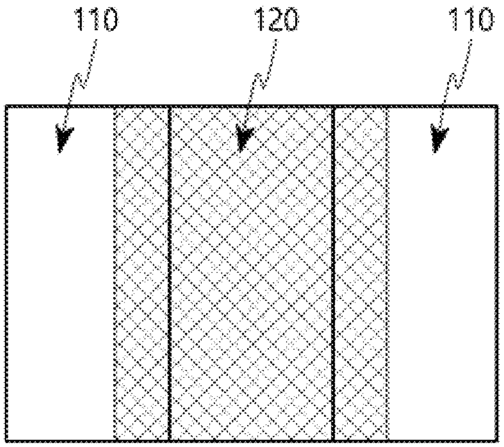

This may be described with reference to FIGS. 5 to 8. As illustrated in FIGS. 5 and 6, the light-transmitting part 120 may be integrally attached along the longitudinal direction to a position of an end or less than half of any one surface of the two light-shielding parts 110, but in this case, the property of the light-transmitting part 120 that tends to be unfolded cannot be sufficiently suppressed, causing a problem in that the gaps in the blind may be eccentrically widened as in the Document 1.

Figure 7:
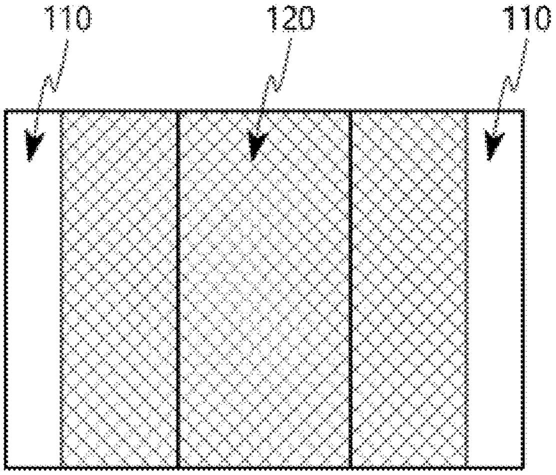
Figure 8:
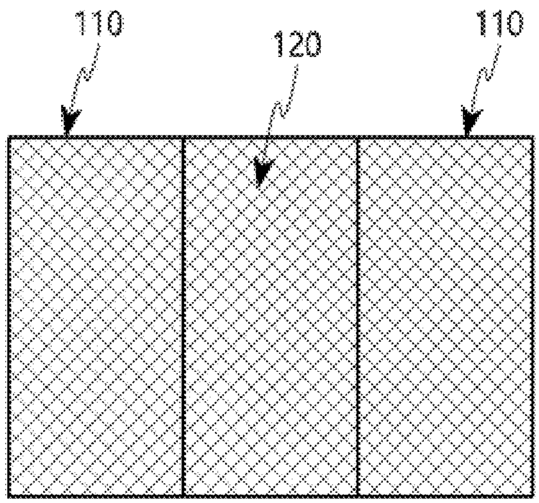

However, as illustrated in FIGS. 7 and 8, when the light-transmitting part 120 is integrally attached to the position of at least half of any one surface of the two light-shielding parts 110 so as to overlap therewith along the longitudinal direction, the property of the light-transmitting part 120 that tends to be unfolded can be sufficiently suppressed when the blind is adjusted to be closed for shading or wind protection, thereby enabling the closed blind to avoid the problem that the gaps in the blind may be eccentrically widened, while maintaining shape.

Figure 9:
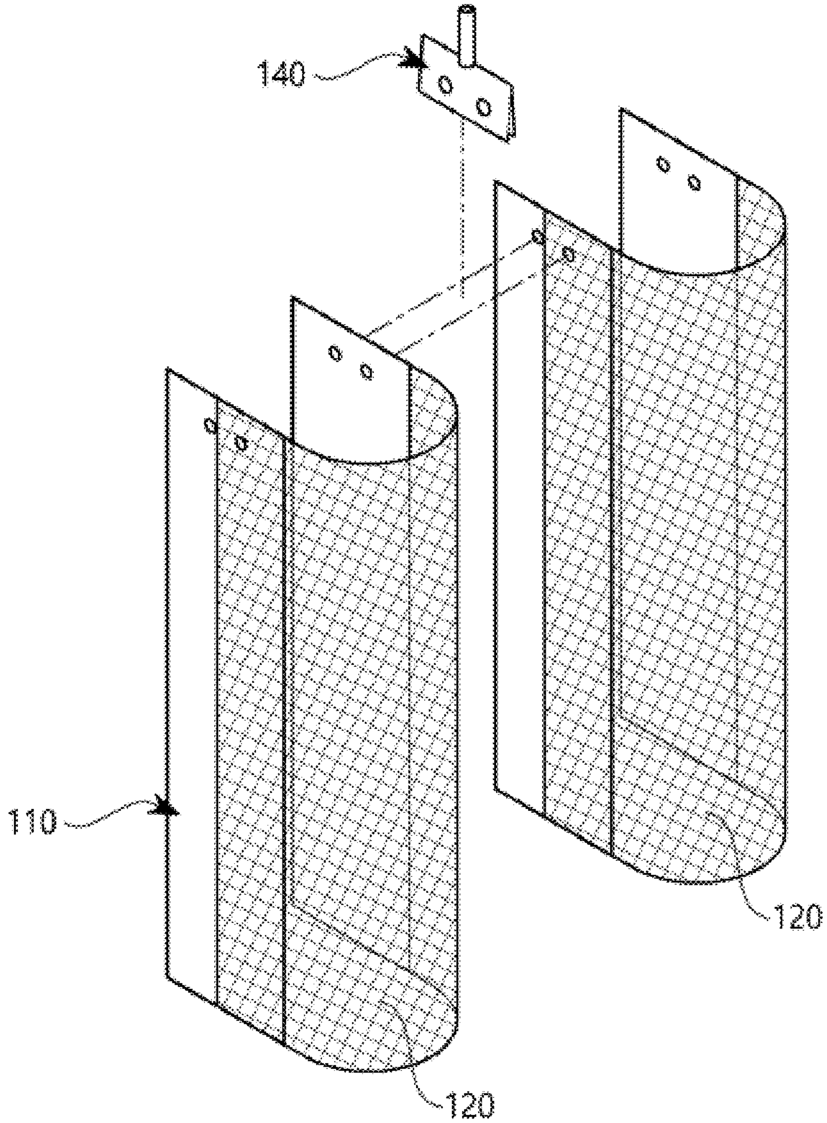
FIG. 9 is a conceptual view illustrating an example of a method of coupling a plurality of pieces of the light-blocking fabric according to the present invention.

The above-described pieces of the light-blocking fabric 100 may be coupled to each other by various methods. For example, referring to FIG. 9, a plurality of installation holes 130 are formed in each of the pieces of the light-blocking fabric 100 by using an auger or a punching machine to install the blind. The above-described installation holes 130 may be formed at corresponding positions so that two adjacent pieces of the light-blocking fabric 100 can be coupled to each other, and each of the pieces of the light-blocking fabric 100 and an adjacent piece of the light-blocking fabric 100 may be connected and coupled to each other using a fixing means 140 detachably attached to the installation holes 130.

Further, to provide more robust coupling of upper sides of the pieces of the light-blocking fabric 100 when the plurality of pieces of the light-blocking fabric 100 are coupled to each other, the installation holes 130 may be formed in such a manner that a film of PET or metal material is attached between each of the pieces of the light-blocking fabric 100 and then drilled.

Additionally, the fixing means 140 may use a means in a form of a detachable clip, and any other means can be used without limitation as long as being capable of fixing the pieces of the light-blocking fabric 100 to a rail of the blind, and allowing the light-shielding parts 110 to be tiltable.

Additionally, when more robust coupling of the above-described pieces of the light-blocking fabric 100 is desired, materials such as a removable Velcro tape or weight may be attached to lower ends of the respective pieces of the light-blocking fabric 100 so that lower sides of the respective pieces of the light-blocking fabric 100 can be coupled to each other at positions corresponding to each other.

The light-blocking fabric 100 according to the present invention manufactured as described above is characterized in that a roll-type fabric comprised of the light-shielding parts 110 and the light-transmitting part 120 can be cut to fit the length according to the space in which the roll-type fabric is installed, and thus there is an advantage in that the blind is easy to adjust in height during installation and easy to handle during working, and that the blind can be installed without being constrained by the installation space.

Additionally, the light-transmitting part 120 can be embodied in a voluminous manner using a mesh fabric of various patterns thereby resulting in an elegant appearance. Furthermore, since the plurality of pieces of the light-blocking fabric 100 are connected to each other for installation when the blind is installed, the light-blocking fabric is easy to replace in case of contamination or damage. Moreover, the pieces of the light-blocking fabric 100 allows the passage of air between the indoor and outdoor spaces through the space between each of the pieces of the light-blocking fabric, thereby making it possible to provide a more comfortable environment compared to the environment in which a conventional blind is installed.

Hereinafter, the present invention will be described in more detail with reference to an exemplary embodiment. The following example is only for an illustrative purpose of describing the present invention in detail and should not be construed as limiting the scope of the present invention.

EXAMPLE

In this example, non-transparent fabrics and a mesh fabric wound in a roll form were put into a fabric processing apparatus, and the mesh fabric was attached between the non-transparent fabrics using a hot melt to manufacture a light-blocking fabric 100.

Then, the manufactured light-blocking fabric 100 was cut to a predetermined length to form a plurality of pieces, and two installation holes 130 were drilled on an upper side of each of the pieces of the light-blocking fabric 100 using a punching machine to manufacture a plurality of pieces of light-blocking fabric 100 each of which includes light-shielding parts 110, with the installation holes 130 formed.

Finally, each of the pieces of the light-blocking fabric 100 was positioned to face an adjacent piece of the light-blocking fabric 100 and then fixed using a fixing means 140 to couple lower ends of the adjacent pieces of the light-blocking fabric 100 to each other.

Figure 10:
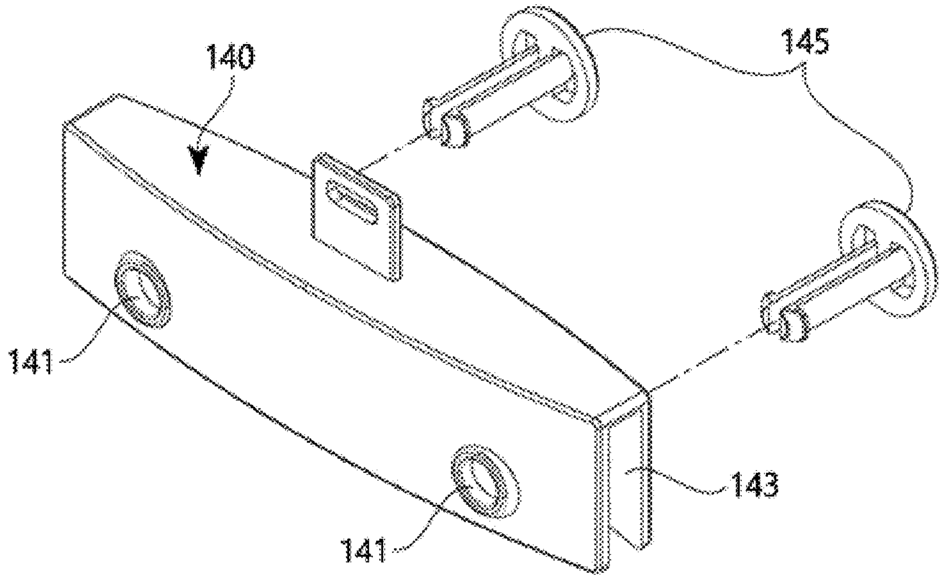
FIG. 10 is a perspective view illustrating a fixing means in the form of a clip for fixing the light-blocking fabric manufactured by the manufacturing method according to the embodiment.

Referring to FIG. 10, the fixing means 140 in a form of a clip has a coupling hole 141 corresponding to each of a plurality of installation holes 130 formed in the pieces of the light-blocking fabric 100, so as to allow upper sides of each adjacent pieces of the light-blocking fabric 100 to be coupled to each other. The adjacent pieces of the light-blocking fabric 100 were positioned in a space 143 defined in the clip-shaped fixing means 140, and the upper sides of the adjacent pieces of the light-blocking fabric 100 were fixedly coupled to each other by a wedge-shaped fixing pin 145 passing through each of the installation holes 130 and each of the respective coupling holes 141.

Figure 11:
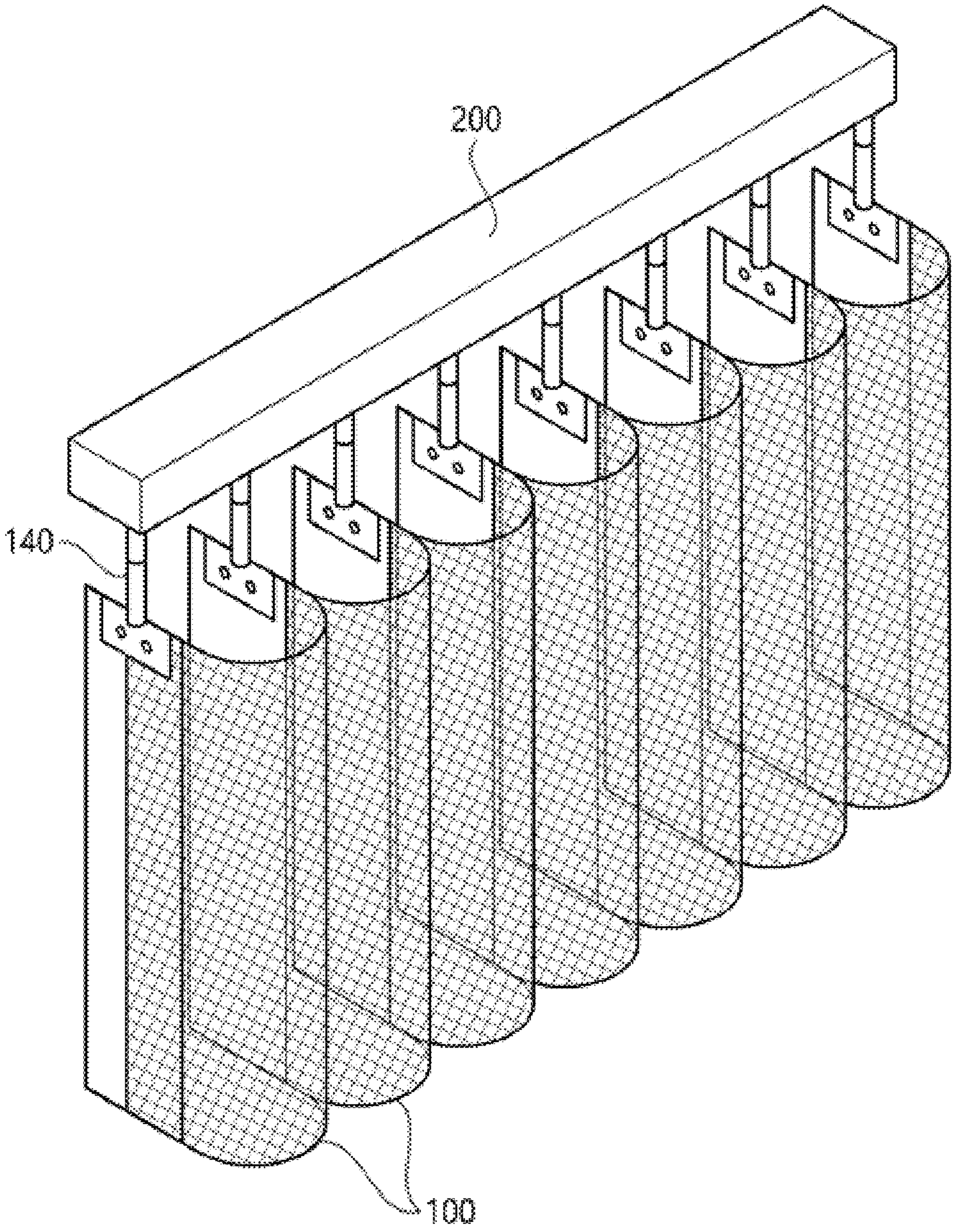
FIG. 11 is a view illustrating a state in which a blind formed by fixedly coupling a plurality of pieces of the light-blocking fabric manufactured by the manufacturing method according to an embodiment is unfolded so that the fabric pieces are arranged at a regular interval.

Referring to FIG. 11, the pieces of the light-blocking fabric 100 were fastened to a roller 220 of a guide rail 210 included in a blind housing 200 which will be described later so that the pieces of the light-blocking fabric 100 can be horizontally folded or unfolded over the guide rail 210, whereby a blind was completed.

Figure 12:
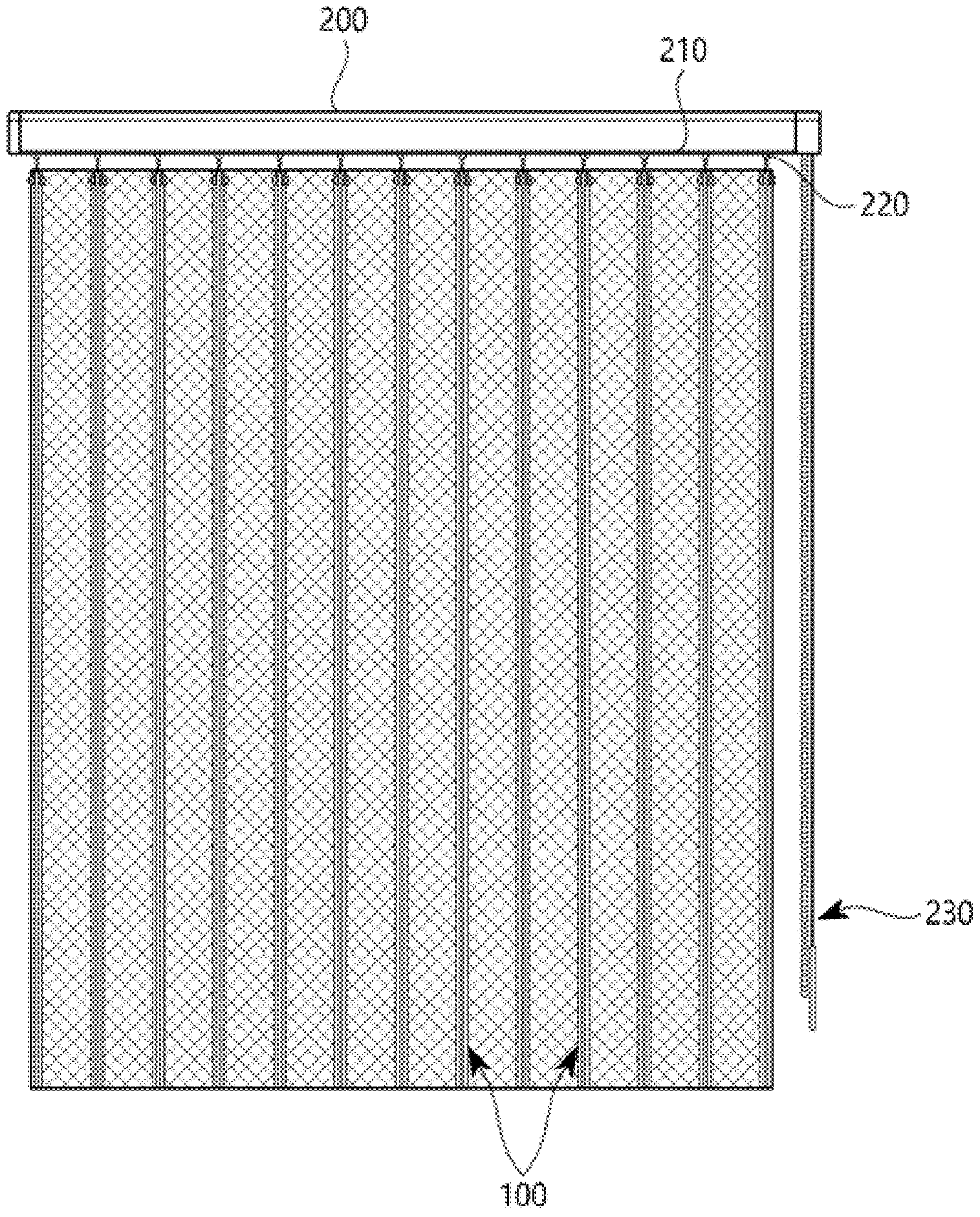
FIG. 12 is a view illustrating a state in which the blind formed by fixedly coupling the plurality of pieces of the light-blocking fabric manufactured by the manufacturing method according to the embodiment.

Referring to FIG. 12, the blind housing 200 used to manufacture the blind according to the example was configured using a conventionally known one, the clip-shaped fixing means 220 was attached to each of plurality of rollers 220 that allows the pieces of the light-blocking fabric 100 to be horizontally folded or unfolded over the guide rail 210, and an adjustment cord 230 was installed to be attached to the fixing means 140 to allow the blind to be tilted by equal to or greater than 90° and to tilt the fixing means 140, wherein the adjustment cord 230 was configured to be located at a position passing through the upper side of the fixing means 140 so that the adjustment cord 230 is fastened, and to allow the tilting of the pieces of the light-blocking fabric 100.

In this state, when the adjustment line 230 is pulled to shield the indoor and outdoor spaces, upper portions of the respective light-shielding parts 110 of the pieces of the light-blocking fabric 100 fixed by the fixing means 140 are tilted by 90°, allowing the respective light-shielding parts 110 to be maintained in a state substantially parallel to the window glass. Here, each surface of the light-shielding parts 110 is not deformed in the center portion thereof, and tilting force of the fixing means 140 allows the light-shielding parts 110 made of a non-light transmitting fabric to completely shield the indoor and outdoor spaces. Furthermore, when the respective light-shielding parts 110 are maintained in the direction perpendicular to the window glass, the indoor and outdoor spaces are opened. Thus, it was possible to manufacture a blind capable of lighting and ventilation through light-transmitting parts 120.

Although embodiments of the present invention were described in detail above, the scope of the present invention is not limited to a specific embodiment described above. It should be understood by those of ordinary skill in the art that various changes and modifications from the spirit of the present invention defined in the appended claims without departing from the gist of the present invention and such changes and modifications belong to the spirit and scope of the present invention.

INDUSTRIAL APPLICABILITY

According to the present invention, a light-blocking fabric is manufactured by attaching a light-transmitting part along a longitudinal direction to a position of at least half of any one surface of two light-shielding parts. Thus, when wound in a roll form, the light-blocking fabric can be wound uniformly without wrinkles on the light-shielding parts and the light-transmitting part by balancing the thickness of the light-shielding parts and the light-transmitting part, thereby making it possible to prevent the problem of degrading the aesthetic appearance due to wrinkles. It is also possible to prevent the problem that when a blind manufactured using the light-blocking fabric is folded as need, the gaps in the blind may be eccentrically widened. Thus, the present invention can be more effectively used in the field of manufacturing a light-blocking fabric used for blinds.

The invention claimed is:

1. A manufacturing method for a light-blocking fabric, the manufacturing method comprising:

(a) a first injection step of unwinding two light-shielding part fabrics wound in two separate roll forms, respectively, and injecting the two light-shielding part fabrics into a fabric processing apparatus in a longitudinal direction;

(b) a coating step of coating an adhesive onto at least half of a width of each of the two light-shielding part fabrics in the longitudinal direction while the two light-shielding part fabrics move along a guide part of the fabric processing apparatus;

(c) a second injection step of unwinding a light-transmitting mesh fabric wound in a roll form, horizontally arranging, and injecting the light-transmitting mesh fabric into the fabric processing apparatus in the longitudinal direction such that the light-transmitting mesh fabric overlaps each of the two light-shielding part fabrics on which the adhesive has been coated in the coating step in the longitudinal direction;

(d) a manufacturing step of manufacturing the light-blocking fabric by attaching, to the light-transmitting mesh fabric injected in the second injection step, the two light-shielding part fabrics on which the adhesive has been coated in the coating step such that two opposite sides of an inner surface of the light-transmitting mesh fabric at both ends in a width direction thereof are attached to the two light-shielding part fabrics, respectively, wherein the longitudinal direction is perpendicular to the width direction, and wherein the light-transmitting mesh fabric starts bonding with each of the two light-shielding part fabrics at a position that is at least half of the width of each of the two light-shielding part fabrics; and (e) a winding step of winding, in a roll form, the light-blocking fabric manufactured in the manufacturing step about an axis perpendicular to the longitudinal direction, wherein the light-blocking fabric is not cut between the first injection step and the winding step.

2. The manufacturing method of claim 1, wherein the two light-shielding part fabrics and the light-transmitting mesh fabric between the two light-shielding part fabrics are attached together with a hot melt or adhesive.

3. The manufacturing method of claim 1, wherein the two light-shielding part fabrics and the light-transmitting mesh fabric between the two light-shielding part fabrics are attached together by sewing or ultrasonic welding.

4. The manufacturing method of claim 1, further comprising:

cutting the light-blocking fabric in the longitudinal direction to a plurality of light-blocking fabric units of a predetermined length.

5. The manufacturing method of claim 1, wherein the two light-shielding part fabrics are injected into a fabric processing apparatus in parallel.

6. A blind including the light-blocking fabric manufactured according to the method of claim 1.

* * * * *